May 7, 1963 H. J. MUMMA 3,088,576
SCALE DISCHARGE DEVICE
Original Filed June 6, 1953 3 Sheets-Sheet 1
FIG_1
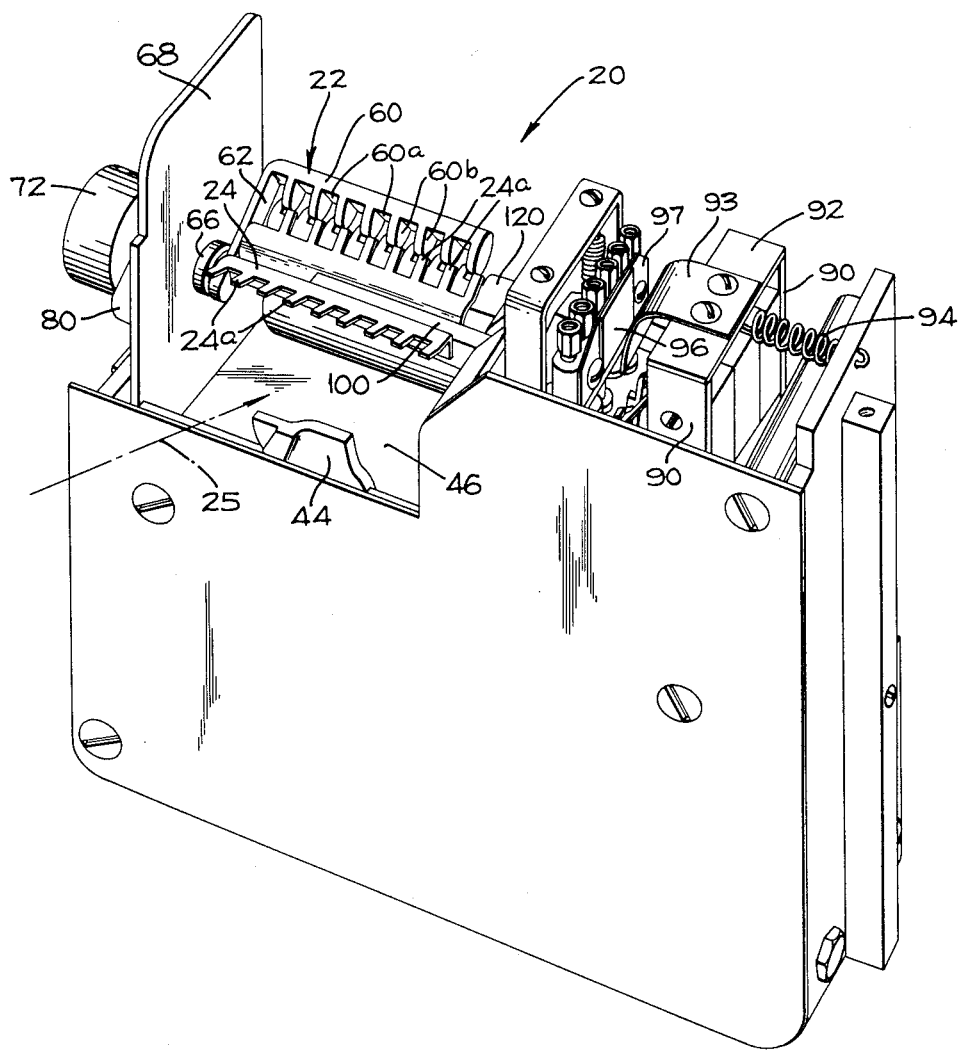
INVENTOR
HAROLD J. MUMMA
BY *Hans G. Hoffmeister*
ATTORNEY May 7, 1963 H. J. MUMMA 3,088,576
SCALE DISCHARGE DEVICE
Original Filed June 6, 1953 3 Sheets-Sheet 2
FIG_2
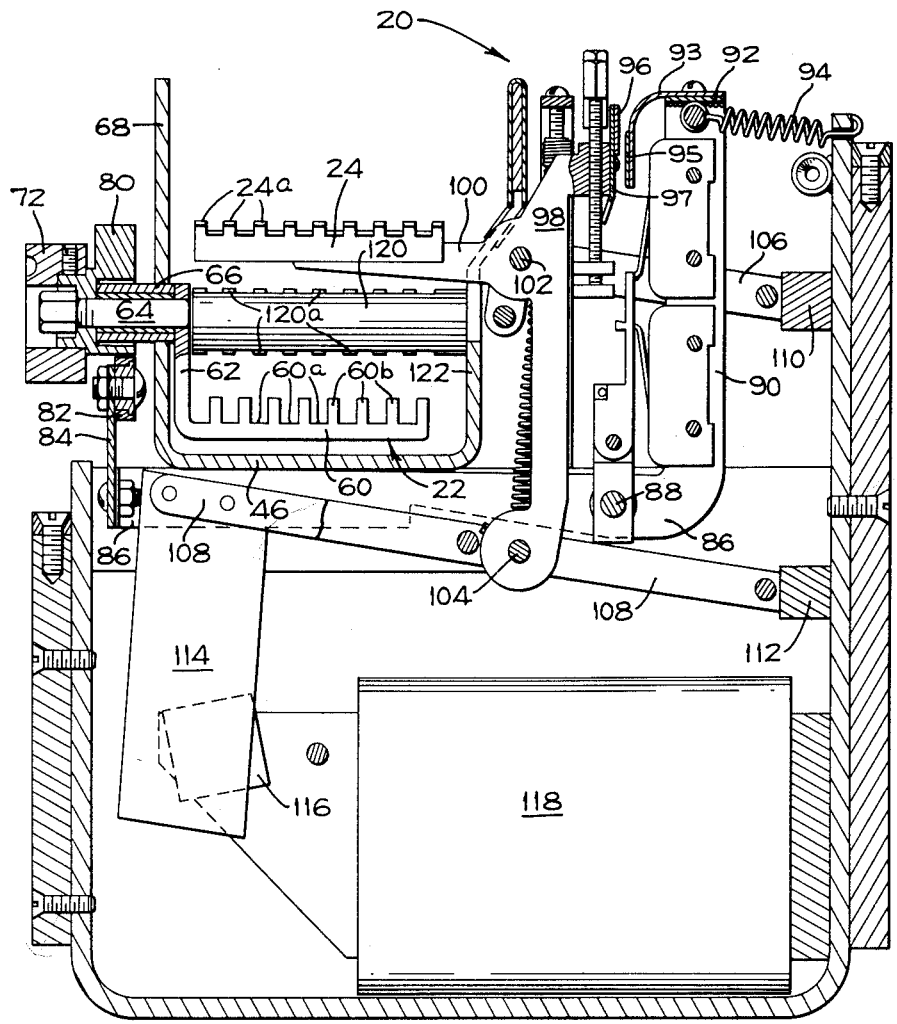
INVENTOR
HAROLD J. MUMMA
BY
ATTORNEY

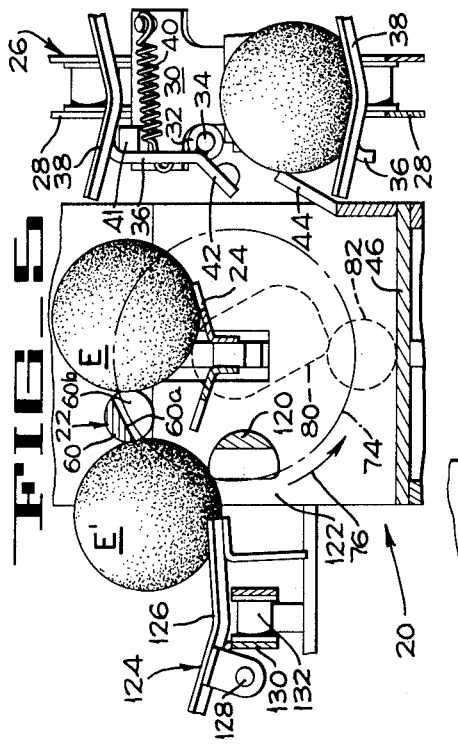

United States Patent Office 3,088,576
Patented May 7, 1963

---

3,088,576
SCALE DISCHARGE DEVICE
Harold J. Mumma, Riverside, Calif., assignor to FMC Corporation, San Jose, Calif., a corporation of Delaware
Original application June 6, 1953, Ser. No. 358,621, now Patent No. 2,993,592, dated July 25, 1961. Divided and this application July 13, 1961, Ser. No. 123,723
6 Claims. (Cl. 198—25)

The present invention pertains to weighing scales and more particularly relates to automatic discharge means for moving a fragile article from a scale platform after the article is weighed.

The present application is a division of the copending patent application of Harold J. Mumma, Serial No. 358,621 for a "Machine for Handling Eggs of Different Quality and Weight," filed June 6, 1953, now Patent No. 2,993,592. In the operation of the machine disclosed in that application eggs are automatically subjected to weighing, sorting, and packing operations. After each egg is weighed on a scale platform, the scale discharge device of the present invention removes the weighed egg from the platform automatically and in a rapid continuous movement. At the same time, the scale discharge device regulates the movement of the next incoming egg to prevent its breakage. Even though eggs are relatively fragile, the discharge of the eggs from the scale platform is rapidly accomplished without damaging the eggs. It is thus possible to operate the processing machine, of which the scale discharge device is a part, at a high rate of speed.

Accordingly, one of the objects of the present invention is to provide a rapidly operating scale discharge device for handling fragile objects such as eggs.

Another object of the present invention is to provide a mechanism for concurrently discharging an egg from a scale platform and controlling the next incoming egg.

Another object is to provide a scale discharge mechanism which will handle any of the different sizes of eggs usually processed without requiring adjustment of the discharge mechanism.

These and other objects and advantages of the present invention will become evident from the following description and the accompanying drawings wherein:

FIGURE 1 is a perspective illustrating an egg weighing scale and the cooperating scale discharge device of the present invention.

FIGURE 2 is a longitudinal section through the scale and discharge device of FIGURE 1.

FIGURES 3–5, inclusive, are enlarged schematic operational views illustrating successive stages in the transfer of eggs from one conveying means to another by means including the scale discharge device of this invention.

As previously mentioned, the scale discharge mechanism of the present invention is part of the egg processing machine disclosed in the above-mentioned Mumma patent application. In that machine, an upwardly inclined feed conveyor removes eggs one at a time from a candling mechanism and discharges them onto a scale. The discharge mechanism of the present invention controls the movement of each egg onto the scale while it moves a preceding egg onto a take-away conveyor that carries the egg to a particular collecting station.

The upwardly inclined feed conveyor and the take-away conveyor form no part of the present invention. For further details concerning these mechanisms as well as any mechanism of the machine not specifically described herein, reference may be had to the above-mentioned Mumma application, Serial No. 358,621.

The scale mechanism 20 (FIG. 1) with which the scale discharge device 22 of the present invention is cooperatively associated, includes a vertically depressible trough-shaped weighing platform 24 to which eggs are delivered one at a time by a single file elevator 26 (FIG. 3) that is disposed substantially along an upwardly inclined diagonal path 25 (FIG. 1). The elevator 26 (FIG. 3) includes an endless driven chain 28 to which are attached a spaced series of T-shaped conveyor cup mounting plates 30 (only one plate 30 being shown). Each mounting plate 30 carries a tubular bearing 32 in which is mounted a rotatable pivot stud 34 that is welded to an upright stem member 36.

The upper end portion of the stem 36 supports a shallow, V-shaped egg receiving cup 38 that is fixed to the stem. A tension spring 40 is connected to the stem 36 above the pivot stud 34 and to the mounting plate 30 in order to normally urge the stem to an upright position against a stop 41 which is secured to the plate 30. In this upright position of the stem, the cup 38 is level and an egg E supported therein will not roll from the cup. A lower end portion 42 of the stem is inclined toward the scale mechanism 20 and functions as a cam follower for tilting the cup 38 to its discharge position when it becomes transversely aligned with the weighing platform 24, as will presently be explained.

A stationary camming ledge 44 (FIGS. 1 and 3) is secured to a frame member 46 of the scale 20 in a position lying in the path of the bent cam follower portion 42 of the stem of each rising elevator cup. When the cup 38 is adjacent the scale platform 24, the cam follower portion 42 strikes the camming ledge 44, thus causing the progressive tilting of the egg cup 38 toward the scale platform. The egg E that is supported by the cup rolls toward the platform 24 by gravity and into contact with a horizontally disposed cylindrical transfer rod 60 (FIG. 4) of the scale discharge device 22. The transfer rod 60, in a manner later more fully explained, orbits around the scale platform 24 and controls the descent of the incoming egg E onto the platform. At the same time, the rod 60 effects the discharge of an egg E' that was deposited on the scale platform 24 from the egg cup which preceded the cup carrying the egg E.

The transfer rod 60 (FIGS. 1 and 2) of the scale discharge device 22 is connected by means of a radially directed arm 62 to a horizontal driveshaft 64 which is rotatably mounted in a bearing sleeve 66. The bearing sleeve 66 is fixed to an upstanding leg 68 of the frame member 46. To the free end of the shaft 64 is secured a drive hub or extension member 72 which is connected to a sprocket and chain drive, not shown.

During the transfer of eggs from the elevator cups 38 (FIGS. 3–5) to the scale platform 24, the shaft 64 is rotated in a direction to carry the transfer rod 60 in a circular path 74 around the scale platform 24 in the direction of the arrow 76. The orbital movement of the transfer rod 60 is synchronized with the movement of the elevator chain 28 and is so related thereto that the transfer rod 60 is disposed in contact, or substantially so, with the egg E' before the egg E begins to roll from its associated elevator cup 38. At this time, the scale platform 24 has reached its maximum depression due to the weight of egg E' and is locked in that position by means of a rotatable cam 80 (FIG. 2) that is secured to the drive hub member 72.

During its rotation, the cam 80 strikes a cam follower roller 82 which is secured to a plate 84 that interconnects the ends of two parallel bell crank levers 86 (only one of which is shown) which have a common transverse pivot shaft 88 fixed in the scale frame. The bell cranks 86 are provided with upstanding leg portions 90, the ends of which are interconnected by a strap 92 which has a spring steel brake arm 93 secured thereto. A tension spring 94 connects the upper portion of the bell crank legs 90 to a fixed part of the scale frame in order to urge the bell cranks in a direction urging the roller 82 against the cam 80. Rotation of the cam 80, accordingly, depresses the follower roller 82 and the bell cranks 86 are rotated about the pivot shaft 88. The upper ends of the legs 90 thus move toward the scale platform 24 and cause a friction facing 95 of the brake arm 93 to engage a friction facing 96 on a pad 97.

The pad 97 is secured to the upper end portion of a bracket 98 which has a projecting arm 100 that forms a part of the scale platform 24, and upper and lower pivot shafts 102 and 104, respectively. Horizontally spaced pairs of upper link arms 106 and lower link arms 108, only one arm 106 being shown, are connected to the pivot shafts 102, 104 and to the scale frame at 110 and 112 to provide a parallelogram mounting linkage maintaining the scale platform 24 horizontal during its vertical movement. The free ends of the arms 108 carry a depending non-ferrous metal vane 114 which passes between the pole pieces 116, only one being shown, of an energized electromagnet 118 to effect a damping of the vertical movement of the scale platform 24 so that the platform is at rest at the time the brake arm 93 and the brake pad 96 become locked. Other details of the scale mechanism are unimportant to this disclosure, but may be further understood by reference to the aforementioned pending patent application.

As the egg E' (FIGS. 3–5) begins to be forced sidewise off the scale platform 24 by the transfer rod 60, the cup 38 carrying the egg E tilts progressively farther toward the scale 20 until gravity causes the egg to roll from the cup and into contact with the trailing surface of the advancing transfer rod. Thus positioned, the continued movement of the transfer rod 60 along the path 74 in the direction of the arrow 76 causes the egg E to be retarded so that it will come to rest in the trough of the scale platform 24 without rolling back and forth to seek its lowest level. This gentle lowering of the egg into the scale platform trough assures that the platform 24 will not move from its locked position and that the egg will not be damaged. The incoming egg E is thus eased into position on the scale platform 24 while the egg E' that has been previously weighed is gently pushed from the platform toward a bridge member 120.

The bridge 120 (FIGS. 1 and 2) comprises a horizontally disposed semicylindrical rod that is fixed to an upright leg 122 of the frame member 46 and provides an egg support surface between the discharge side of the scale platform and a discharge conveyor 124. The discharge conveyor is intermittently driven in timed relation to the elevator conveyor 26 and each time an egg is discharged from the scale platform 24, an empty cup 126 of the discharge conveyor lies at rest in the path of the egg.

Each discharge conveyor cup 126 is pivoted on a pivot pin 128 that is held by a bracket 130 which is secured to an endless roller chain 132. During its travel past the scale platform 24, one end of the discharge conveyor cup 126 (FIG. 4) slides up the edge surface of a cam disc 134 which causes the cup to pivot about the pin 128 and incline downward toward the scale. The pivot pin 128 is mounted off-center relative to the cup, so that the egg deposited therein causes the cup to gravitate to a level position when the filled cup is advanced away from the disc 134.

An additional feature of the scale discharge device 22 which contributes uniquely to providing a reliable, compact and rapid-acting discharge mechanism suitable for the handling of fragile articles of non-uniform sizes, resides in the configurations of the scale platform 24, the transfer rod 60 and the bridge member 120. As is best shown in FIGURES 1 and 2, the transverse edges of the scale platform 24 are of serrated form and the transfer rod 60 is provided with a series of spaced recesses 60a that form digits 60b therebetween which, if the scale platform is sufficiently elevated, intermesh with the digits 24a formed in the serrated scale platform edges. The result of this possible meshed relation of the transfer rod 60 and the scale platform 24, is that if the egg weighed is a very small one and the weighing platform is consequently depressed only a very short distance, the transfer rod 60 will follow a shallow arcuate path over the platform to avoid the possibility of crushing the egg. In other words, if the interdigitating serrations were not provided, the transfer rod 60 would require a higher arcuate path over the scale platform and thus might descend on, and crush, very small eggs.

As the transfer rod 60 (FIGS. 3–5) passes over the edge of the scale platform 24 and descends toward the underside of the platform, the digits 60b of the transfer rod 60 pass between a series of spaced digits 120a provided on the bridge member 120, and the transfer rod arrives at its former position to begin another egg discharge cycle. By providing the digits 120a on the bridge member 120, the bridge can be closely spaced to the scale platform so that the eggs ejected from the scale platform become immediately supported by the bridge.

While a particular embodiment of the present invention has been shown and described, it will be understood that the details herein set forth are capable of modification and variation without departing from the principles of the invention and that the scope of the invention should be limited only by the scope of the appended claims.

Having thus described a preferred embodiment of my invention, that which I claim and desire to protect by Letters Patent is:

1. In combination, a scale platform, means mounting said platform in generally horizontal position and supported at one end only, a drive member mounted for rotation about a generally horizontal axis adjacent the free end of said platform in spaced relation thereto, and an ejector secured to said rotary drive member and having an article contact member disposed generally parallel to said scale platform and movable in an orbital path around said platform about said axis, said article contact member being movable across the upper surface of said platform during a portion of said orbital movement to contact an article on the platform and eject it therefrom.

2. In combination, a scale platform, means mounting said platform in generally horizontal position and supported at one end only, a drive member mounted for rotation about a generally horizontal axis adjacent the free end of said platform in spaced relation thereto, an ejector secured to said rotary drive member and having an article contact member disposed generally parallel to said scale platform and movable in an orbital path around said platform about said axis, said article contact member being movable across the upper surface of said platform during a portion of said orbital movement to contact an article on the platform and eject it therefrom, a discharge conveyor adjacent said platform and adapted to receive an article ejected therefrom, and a bridge disposed between said platform and said conveyor to support the article as it moves toward said conveyor.

3. The mechanism of claim 2 wherein said article contact member has a plurality of fingers projecting radially toward said axis and said scale platform is provided with grooves along its side edges to receive the fingers of said article contact member as said member moves upwardly in its orbital path, the interdigitation of said fingers and said grooves being effective to permit said article contact member to move along a relatively flat arc as it traverses said platform.

4. A scale discharge mechanism adapted to control the movement of eggs from a delivery conveyor to a scale platform and from the platform to a discharge conveyor on the opposite side of the scale platform from the delivery conveyor, said mechanism comprising a driven pusher member mounted for movement around the weighing platform in a path which at one point is coincident with the path of an incoming article being transferred to the platform, movement of said pusher member beyond the point of said coincidence being across the platform in a path closely adjacent the platform to contact a weighed article thereon, means for moving said pusher member in timed relation with an incoming article such that the article bears against the trailing side of said pusher member as said member moves across the platform, whereby said pusher member simultaneously ejects the weighed article and retards the advance of the incoming article, and a support bridge disposed between said platform and the discharge conveyor and adapted to receive an article ejected from the platform and guide it to the discharge conveyor.

5. In combination, a support structure, a scale platform mounted in said structure for vertical movement under the weight of an object placed thereon, and a pusher member mounted in said frame for movement in an orbital path around said platform, said path being clear of said scale platform in all vertical positions of the platform and having an upper arcuate portion close to the upper surface of said platform whereby said pusher member will contact an article on said platform and eject it from said platform as it moves along said arcuate portion of the path.

6. In combination with a platform for temporarily storing single articles, a pusher member movable in an orbital path around said platform in timed relation with the advance of an article fed thereto, and drive means for moving said pusher member along said path, the orbital path of said driven pusher member lying in the path of an incoming article for retarding advance of the article to an idle position on the platform during a part of said movement along said orbital path, said pusher member being arranged to strike and eject the article from said platform to another portion of said orbital path.

References Cited in the file of this patent

UNITED STATES PATENTS 2,197,156    Ott _____ Apr. 16, 1940